United States Patent
Yae

(10) Patent No.: US 9,504,080 B2
(45) Date of Patent: Nov. 22, 2016

(54) VEHICLE SUPPORTING EFFICIENT BLUETOOTH CONNECTION AND CONTROL METHOD THEREOF

(71) Applicant: Hyundai Motor Company, Seoul (KR)

(72) Inventor: Seong Soo Yae, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/931,022

(22) Filed: Nov. 3, 2015

(65) Prior Publication Data

US 2016/0150588 A1    May 26, 2016

(30) Foreign Application Priority Data

Nov. 20, 2014  (KR) ........................ 10-2014-0162336

(51) Int. Cl.
| | |
|---|---|
| *H04W 84/18* | (2009.01) |
| *H04W 76/02* | (2009.01) |
| *H04W 4/00* | (2009.01) |
| *H04L 29/08* | (2006.01) |
| *H04W 12/06* | (2009.01) |

(52) U.S. Cl.
CPC ............ *H04W 76/027* (2013.01); *H04L 67/12* (2013.01); *H04W 4/008* (2013.01); *H04W 12/06* (2013.01); *H04W 76/023* (2013.01); *H04W 76/028* (2013.01)

(58) Field of Classification Search
CPC . H04W 84/18; H04W 76/027; H04W 4/008; H04W 76/023; H04W 76/028; H04L 67/12
USPC ........................................................ 455/41.2
See application file for complete search history.

(56) References Cited

U.S. PATENT DOCUMENTS

| | | | | |
|---|---|---|---|---|
| 6,452,910 B1 * | 9/2002 | Vij | ........................ | H04L 12/66 370/310 |
| 7,046,644 B1 * | 5/2006 | Lappetelainen | ...... | H04W 72/08 370/329 |
| 7,046,961 B2 * | 5/2006 | Park | .................... | H04M 1/7253 370/493 |
| 7,095,748 B2 * | 8/2006 | Vij | ........................ | H04L 12/66 370/328 |
| 7,181,657 B2 * | 2/2007 | Soga | ........................ | H04L 1/20 714/704 |
| 7,218,644 B1 * | 5/2007 | Heinonen | ............ | H04B 1/7143 370/468 |
| 7,352,997 B2 * | 4/2008 | Torvinen | ................. | H04L 29/06 370/259 |
| 7,377,441 B2 * | 5/2008 | Wiklof | ................. | G06K 7/0004 235/462.46 |
| 7,530,498 B2 * | 5/2009 | Wiklof | ................. | G06K 7/0004 235/462.46 |
| 7,747,218 B2 * | 6/2010 | Sasai | .................... | H04L 63/0492 455/41.1 |
| 7,886,033 B2 * | 2/2011 | Hopmann | ........... | H04L 12/2807 370/401 |
| 8,064,594 B2 * | 11/2011 | Mohan | .................. | H04M 1/725 379/413.03 |

(Continued)

FOREIGN PATENT DOCUMENTS

| | | |
|---|---|---|
| JP | 2013-062581 A | 4/2013 |
| KR | 2002-0066249 A | 8/2002 |

(Continued)

*Primary Examiner* — Hai V Nguyen
(74) *Attorney, Agent, or Firm* — Mintz Levin Cohn Ferris Glovsky and Popeo, P.C.; Peter F. Corless

(57) ABSTRACT

A method for performing Bluetooth pairing with a mobile device by a head unit of a vehicle includes: initiating a Bluetooth pairing procedure between the mobile device and the head unit; storing an address of the mobile device upon the initiation of the pairing procedure; detecting an error generated in the pairing procedure; and automatically retrying the pairing procedure using the stored address of the mobile device or terminating the pairing procedure, based on a type of the detected error.

17 Claims, 4 Drawing Sheets

(56) References Cited

U.S. PATENT DOCUMENTS

| | | | | |
|---|---|---|---|---|
| 8,107,945 B2* | 1/2012 | Hoffner | H04W 24/04 | 455/418 |
| 8,233,366 B2* | 7/2012 | Hicks | G11B 19/041 | 369/53.42 |
| 8,365,018 B2* | 1/2013 | McIntosh | H04L 12/2697 | 709/224 |
| 8,478,849 B2* | 7/2013 | Marl | H04L 12/2807 | 709/223 |
| 8,483,029 B2* | 7/2013 | Hicks | G11B 19/041 | 369/53.42 |
| 8,655,307 B1* | 2/2014 | Walker | H04W 52/0212 | 455/343.5 |
| 8,732,753 B2* | 5/2014 | Warrick | G06F 21/305 | 725/39 |
| 9,110,805 B1* | 8/2015 | Tsai | G06F 11/0793 | |
| 9,197,985 B2* | 11/2015 | Seo | H04M 1/7253 | |
| 9,408,143 B2* | 8/2016 | Walker | H04W 52/0212 | |
| 9,412,073 B2* | 8/2016 | Brandt | H04L 63/1408 | |
| 2002/0065071 A1* | 5/2002 | Hunzinger | H04W 76/028 | 455/421 |
| 2002/0140963 A1* | 10/2002 | Otsuka | G06K 15/00 | 358/1.14 |
| 2003/0223461 A1* | 12/2003 | Sharma | H04M 7/1295 | 370/493 |
| 2004/0207719 A1* | 10/2004 | Tervo | H04M 1/7253 | 348/14.02 |
| 2005/0037708 A1* | 2/2005 | Torvinen | H04L 29/06 | 455/41.2 |
| 2005/0071714 A1* | 3/2005 | Soga | H04L 1/20 | 714/704 |
| 2005/0194446 A1* | 9/2005 | Wiklof | G06K 7/0004 | 235/462.46 |
| 2005/0197093 A1* | 9/2005 | Wiklof | H04L 1/1685 | 455/343.1 |
| 2006/0072241 A1* | 4/2006 | Feliss | G06F 1/184 | 360/97.22 |
| 2007/0105548 A1* | 5/2007 | Mohan | H04M 1/725 | 455/426.1 |
| 2007/0249383 A1* | 10/2007 | Wiklof | G06K 7/0004 | 455/522 |
| 2008/0052384 A1* | 2/2008 | Marl | H04L 12/2807 | 709/223 |
| 2009/0013210 A1* | 1/2009 | McIntosh | H04L 12/2697 | 714/4.1 |
| 2010/0248707 A1* | 9/2010 | Hoffner | H04W 24/04 | 455/419 |
| 2011/0298596 A1* | 12/2011 | Warrick | G06F 21/305 | 340/12.53 |
| 2012/0290694 A9* | 11/2012 | Marl | H04L 12/2807 | 709/223 |
| 2014/0080416 A1* | 3/2014 | Seo | H04M 1/7253 | 455/41.2 |
| 2014/0128021 A1* | 5/2014 | Walker | H04W 52/0212 | 455/405 |
| 2014/0250470 A1* | 9/2014 | Warrick | G06F 21/305 | 725/81 |
| 2015/0281374 A1* | 10/2015 | Petersen | H04L 67/12 | 709/223 |
| 2016/0050518 A1* | 2/2016 | Seo | H04M 1/7253 | 455/41.2 |
| 2016/0066189 A1* | 3/2016 | Mahaffey | G06F 21/316 | 455/405 |

FOREIGN PATENT DOCUMENTS

| | | |
|---|---|---|
| KR | 2007-0122298 A | 12/2007 |
| KR | 2008-0022327 A | 3/2008 |
| KR | 10-936136 B1 | 1/2010 |
| KR | 2013-0073224 A | 7/2013 |
| KR | 2014-0022190 A | 2/2014 |
| KR | 2014-0025736 A | 3/2014 |
| KR | 2014-0044517 A | 4/2014 |
| KR | 2014-0054914 A | 5/2014 |

* cited by examiner

VEHICLE SUPPORTING EFFICIENT BLUETOOTH CONNECTION AND CONTROL METHOD THEREOF

CROSS-REFERENCE TO RELATED APPLICATION

This application claims the benefit of and priority to Korean Patent Application No. 10-2014-0162336, filed on Nov. 20, 2014, which is hereby incorporated by reference as if fully set forth herein.

BACKGROUND OF THE DISCLOSURE

Technical Field

The present disclosure relates generally to a method for performing Bluetooth connection with a mobile device from a vehicle and, more particularly, to a vehicle capable of efficiently performing reconnection with a mobile device when the vehicle and the mobile device have been paired in the past and connection information thereof remains only in the vehicle or the mobile device, and a control method thereof.

Discussion of the Related Art

Currently, Bluetooth technology is widely used due to rapid spread of smartphones and increased public use of Bluetooth. In addition, Bluetooth technology is used often inside vehicles because users can easily make calls or listen to music while driving the vehicle.

A Bluetooth connection refers to a connection between two devices using the Bluetooth infrastructure, as is known in the art. Connection starts with a request of one device for connection with another device. Specifically, connection consists of a pairing procedure for communication registration between the devices and a connection procedure preformed after registration.

However, if pairing between a mobile device of a driver and a head unit of a vehicle fails, the connection operation fails and is terminated. In order to perform re-pairing, the driver is required to turn on the head unit, search for the head unit on the mobile device, and then request connection all over again, thereby causing inconvenience for the driver.

SUMMARY OF THE DISCLOSURE

Accordingly, the present disclosure is directed to a vehicle supporting efficient Bluetooth connection and a control method thereof which substantially obviate one or more problems due to limitations and disadvantages of the related art.

An object of the present disclosure is to provide a head unit of a vehicle capable of performing re-pairing operation even when registration between two devices supporting Bluetooth connection fails, and a control method thereof.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

According to embodiments of the disclosure, a method for performing Bluetooth pairing with a mobile device by a head unit of a vehicle includes: initiating a Bluetooth pairing procedure between the mobile device and the head unit; storing an address of the mobile device upon the initiation of the pairing procedure; detecting an error generated in the pairing procedure; and automatically retrying the pairing procedure using the stored address of the mobile device or terminating the pairing procedure, based on a type of the detected error.

Furthermore, according to embodiments of the present disclosure, a head unit of a vehicle for performing Bluetooth pairing with a mobile device includes: a Bluetooth module exchanging data according to a Bluetooth protocol and initiating a Bluetooth pairing procedure between the mobile device and the head unit; a memory storing an address of the mobile device upon the initiation of the pairing procedure by the Bluetooth module; and a controller providing control to detect an error generated in the pairing procedure and to automatically retry the pairing procedure using the stored address of the mobile device or terminate the pairing procedure, based on a type of the detected error.

Furthermore, according to embodiments of the present disclosure, a method for performing Bluetooth pairing between a head unit of a vehicle and a mobile device includes: initiating a Bluetooth pairing procedure between the head unit of the vehicle and the mobile device; displaying a menu for receiving input indicating whether a user accepts the pairing procedure on a display of the mobile device; and automatically retrying, by the head unit, the pairing procedure using a stored address of the mobile device when a signal indicating acceptance of the pairing procedure is not received from the mobile device for a certain period of time.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION OF THE DISCLOSURE

Figure 1:
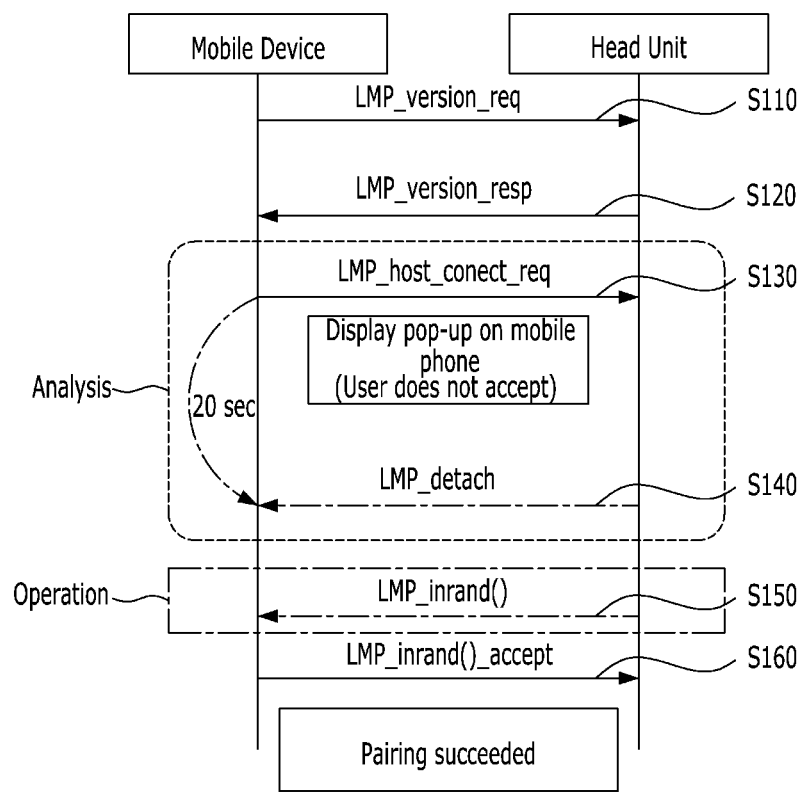
FIG. 1 illustrates an example of a pairing retry procedure when a time out error is generated, according to embodiments of the present disclosure.

Reference will now be made in detail to the preferred embodiments of the present disclosure, examples of which are illustrated in the accompanying drawings. Like reference numerals in the drawings denote like elements and repeated descriptions thereof will be omitted. The suffixes "module", "---er/or" and "unit" of elements herein are used for convenience of description and thus can be used interchangeably and do not have any distinguishable meanings or functions.

In the following description of the present disclosure, a detailed description of known functions and configurations incorporated herein will be omitted when it may make the subject matter of the present disclosure unclear. It should be understood that there is no intent to limit embodiments of the disclosure to the particular forms disclosed; rather, embodiments of the disclosure are to cover all modifications, equivalents, and alternatives falling within the spirit and scope of the disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the controller in conjunction with one or more other components, as would be appreciated by a person of ordinary skill in the art.

Referring now to the disclosed embodiments, techniques described herein propose to analyze a failure type when Bluetooth registration between a vehicle and a mobile device fails and to perform a re-pairing operation based on the failure type by a head unit of a vehicle. Although failure of pairing is determined and connection is abandoned if Bluetooth pairing (i.e., mutual device registration) fails in a legacy method, according to the present disclosure, failed pairing procedure may be performed again by flexibly applying the pairing method described herein. Therefore, failed pairing procedure may be retried and recovered by the head unit of a vehicle, and thus, a problem of a driver being required to manually retry a failed pairing procedure may be solved.

Failure types according to the present disclosure and processing methods thereof will now be described with reference to Table 1.

TABLE 1

| Pairing failure type | Cause type | Processing method |
| --- | --- | --- |
| ① Case when a mobile device does not accept or refuse pairing for a certain period of time or longer | If a user does not accept pairing while pairing is in progress, based on a pairing method, 1) Legacy pairing: No connection is established if the user does not input a password or does not cancel connection. 2) SSP (Secure Simple Pairing): If no response is made to "pass key: XXXXXX; Do you want to connect?" displayed on each device after connection (pairing) is requested, | Pairing is requested again to a corresponding BD address. |
| ② Case when the mobile device refuses pairing | If the mobile device performs LMP_Detach as the mobile device refuses pairing, | The pairing procedure is terminated. |
| ③ Another pairing failure | If pairing is failed due to an error (e.g., message response delay or no response) of the mobile device or the head unit, or If the pairing procedure fails due to a cause other than the causes ① and ②, | Pairing is requested again to the corresponding BD address after LMP_Detach. |

Referring to Table 1, pairing failure types largely include three types according to the present disclosure.

First, when the head unit tries a pairing procedure, and thus a popup menu for receiving input of a password (i.e., the legacy paring method) or acceptance (i.e., the SSP method) is displayed on a screen of the mobile device, if the user gives no input for a certain period of time or longer (i.e., the head unit detects a time out), an error is generated. In this case, the disclosed embodiments propose to automatically request pairing again to a device address of the mobile device by the head unit.

Second, when the above-described popup menu is displayed on the screen of the mobile device, if the user selects a refusal, an error is generated. In this case, the user refuses the pairing procedure, and the disclosed embodiments propose not to retry but to terminate the pairing procedure by the head unit.

Third, if an error other than the above-described two errors occurs, the disclosed embodiments propose to transmit an $LMP_{13}$ Detach message for initializing the pairing procedure to the mobile device, and then to automatically request pairing to the device address of the mobile device by the head unit. Here, the LMP_Detach message refers to a Bluetooth command for releasing a Bluetooth connection which is physically/logically established.

A detailed description is now given of each case with reference to the drawings.

FIG. 1 illustrates an example of a pairing retry procedure when a time out error is generated, according to embodiments of the present disclosure.

As shown in FIG. 1, a version request message and a version response message are exchanged between the mobile device and the head unit (S110 and S120).

Then, the mobile device transmits a host connection request (LMP_host_connect_req) message to the head unit (S130), and a popup menu for checking a pass key (e.g., a password input menu in the legacy case) is displayed on a display of the mobile device as the pass key is exchanged. In this case, if no response is made from the mobile device for a certain period of time (e.g., 20 seconds) or longer, the head unit determines this as a "time out" and transmits an LMP_detach message to the mobile device to release connection (S140).

In this regard, the head unit determines that the user fails to accept pairing and transmits a message (LMP_in_rand) for requesting pairing to a Bluetooth device (BD) address of the mobile device (S150). Then, a popup menu is displayed again on the mobile device. If the user accepts pairing, and an acceptance message (LMP_inrand( )_accept) is transmitted to the head unit (S160), and pairing may be successfully performed.

The case when the user refuses pairing on the popup menu will now be described with reference to FIG. 2.

Figure 2:
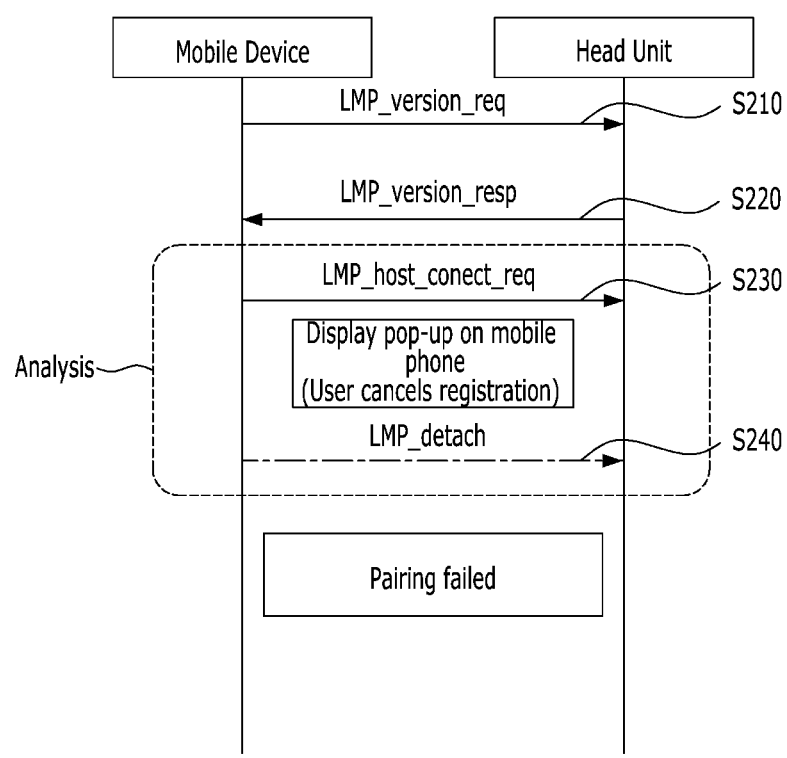
FIG. 2 illustrates an example of a pairing procedure when a user refuses pairing, according to embodiments of the present disclosure.

FIG. 2 illustrates an example of a pairing procedure when the user refuses pairing, according to embodiments of the present disclosure.

As shown in FIG. 2, a version request message and a version response message are exchanged between the mobile device and the head unit (S210 and S220).

Then, the mobile device transmits a host connection request (LMP_host_connect_req) message to the head unit (S230), and a popup menu for checking a pass key (i.e., a password input menu in the legacy case) is displayed on a display of the mobile device as the pass key is exchanged. In this case, if the user selects a refusal on the popup menu, the mobile device transmits an LMP_detach message to the head unit (S240).

As described above, this case is regarded that the user definitely refuses pairing, and the head unit terminates the pairing procedure.

Figure 3:
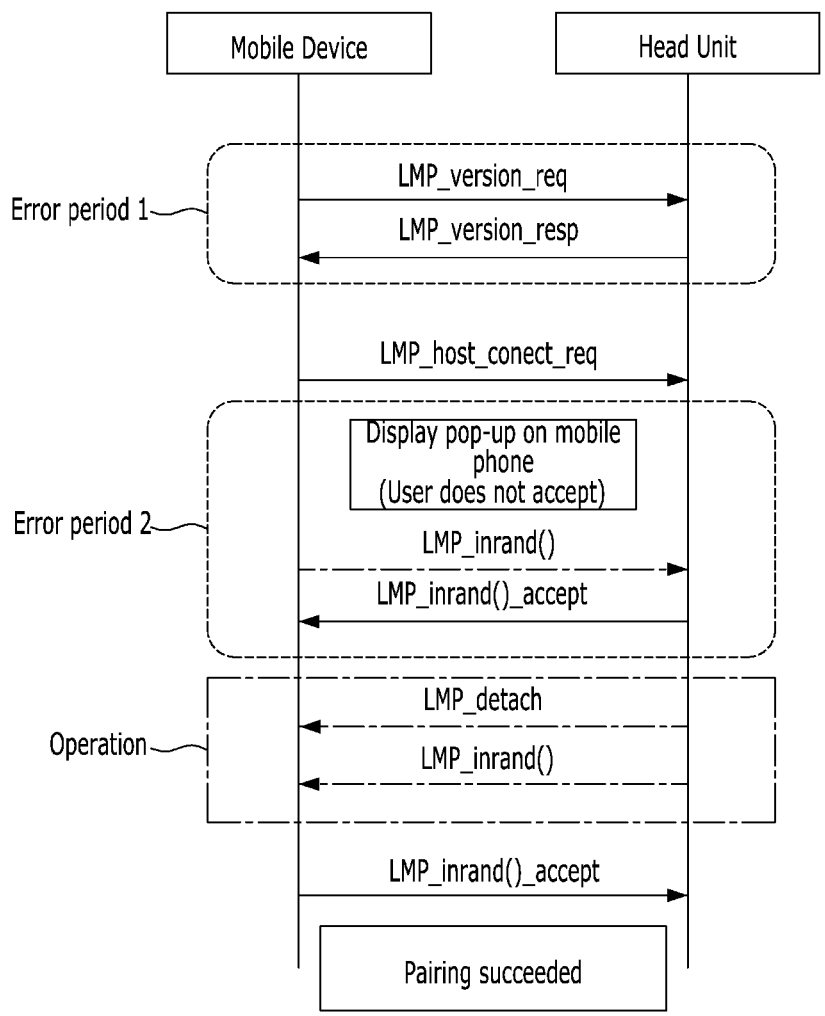
FIG. 3 illustrates an example of a pairing retry procedure when another other type of error is generated, according to embodiments of the present disclosure.

A description is now given of the third case of the other type of error with reference to FIG. 3.

FIG. 3 illustrates an example of a pairing retry procedure when the other type of error is generated, according to embodiments of the present disclosure.

As shown in FIG. 3, an error may be generated due to, for example, device malfunction in a version request/response procedure (error period 1) or in a procedure for exchanging an acceptance message as a user selects acceptance on a popup menu (error period 2). In this error situation other than the error situations of FIGS. 1 and 2, the head unit retries pairing for all errors generated after pairing is started and before pairing is completed (e.g., a time out of any one of messages not included in the illustrated messages but exchanged in the pairing procedure (see the IEEE 802.15.1 standard)).

In this case, the head unit terminates connection by transmitting a connection release (LMP_detach) message to the mobile device with which the head unit has been tried to be paired, and requests pairing to an address (e.g., a BD address) of the mobile device with which pairing has failed, to perform a pairing procedure again.

In this manner, the head unit may efficiently perform pairing based on an error type.

Figure 4:
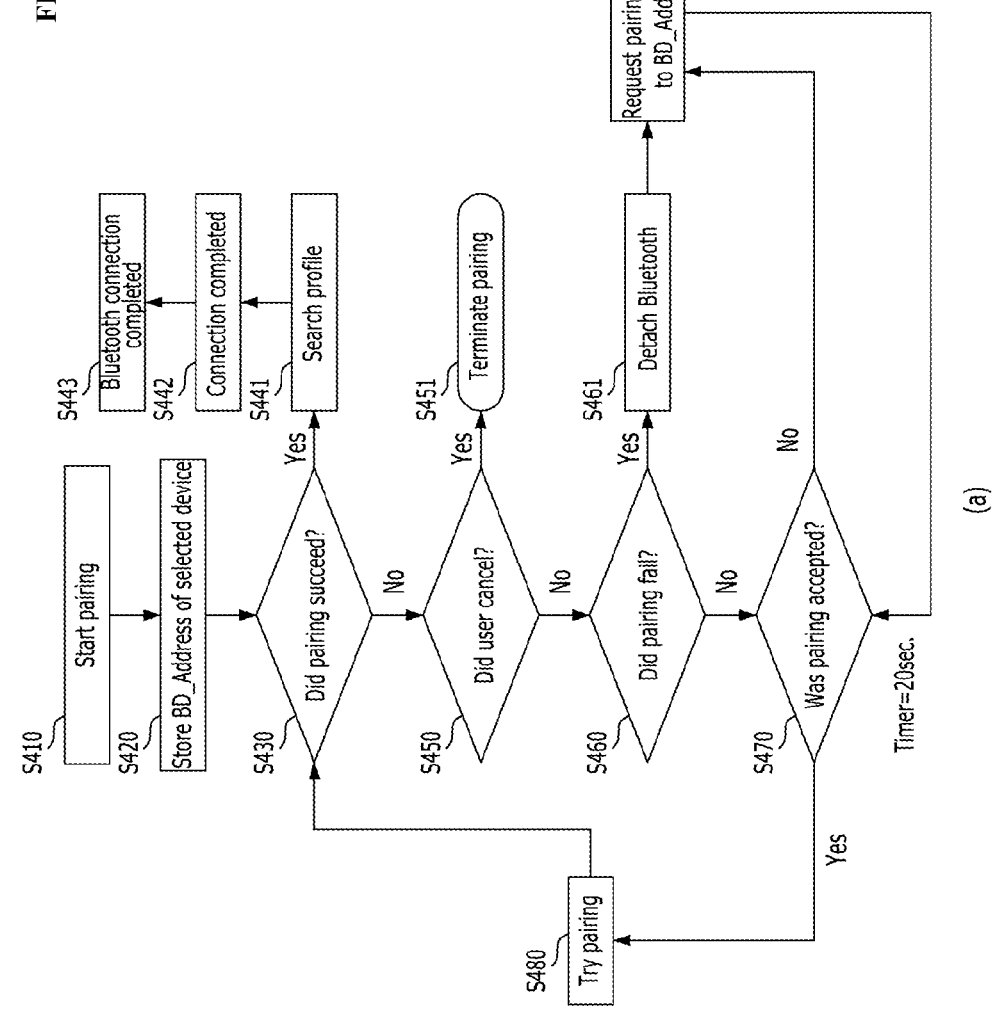
FIG. 4 illustrates an example of a pairing retry procedure of a head unit based on an error type, according to embodiments of the present disclosure.

An integrated description is now given of operation in the above three cases with reference to FIG. 4.

FIG. 4 illustrates an example of a pairing retry procedure of the head unit based on an error type, according to embodiments of the present disclosure.

Referring to (a) of FIG. 4, as a Bluetooth pairing procedure is started (S410), the head unit stores a device address (e.g., a BD address) of the mobile device (S420). If a pairing procedure is performed and pairing succeeds (S430), profile search and connection is performed, and thus connection may be completed (S441 to S443). If pairing fails and the cause of the pairing failure is refusal (e.g., cancellation) by a user (S450), the pairing procedure is terminated (S451). If pairing fails due to a cause other than the user refusal (S460), the head unit transmits an LMP_detach message to the mobile device (S461), and then requests pairing again to the stored BD address (S490). Otherwise, if no response is made to the pairing request for a preset period of time (S470), the head unit also requests pairing again to the stored BD address (S490). If the user accepts pairing and thus an acceptance message is received, the remaining pairing procedure may be performed (S480).

Meanwhile, (b) of FIG. 4 illustrates the procedure of (a) of FIG. 4 in view of exchange of messages, and like reference numerals denote like procedures.

A description is now given of device configurations for implementing the above-described embodiments.

A mobile device according to the present disclosure may be applied to any device providing a Bluetooth function. For example, the mobile device according to the present disclosure may be a smartphone, laptop computer, portable multimedia player (PMP), smart tablet, hands-free headset, or the like. In addition, a head unit according to the present disclosure may include a Bluetooth module for exchanging data in a Bluetooth manner, a memory for storing device addresses (e.g., BD addresses) of target devices to be paired with, a controller for controlling the Bluetooth module and the memory, and the like.

The controller controls determination throughout a pairing procedure and controls the Bluetooth module to generate and transmit/receive a series of messages necessary in the pairing procedure. Furthermore, if an error is detected in the pairing procedure, a procedure for terminating pairing, requesting pairing again, or requesting pairing again after connection is released may be selectively performed based on the type of the detected error.

The above-described device configurations are merely exemplary. A plurality of controllers may be used to individually correspond to a plurality of functions, or a plurality of functions may be controlled by one controller, and a display, an input unit for receiving a user command, a sound output unit, etc. may be further included as necessary.

According to embodiments of the present disclosure, the following effects are achieved.

Even when Bluetooth registration between a vehicle and a mobile device fails, a failure type may be analyzed and a head unit may perform re-pairing operation based on the analyzed type, thereby achieving greater convenience on behalf of an occupant of the vehicle.

It will be appreciated by persons skilled in the art that the effects that could be achieved through the present disclosure are not limited to what has been particularly described hereinabove and other advantages of the present disclosure will be more clearly understood from the detailed description.

The present disclosure can also be embodied as computer-readable code on a computer-readable recording medium. The computer-readable recording medium is any data storage device that can store data which can be thereafter read by a computer system. Examples of the computer-readable recording medium include hard disk drives (HDDs), solid state disks (SSDs), silicon disk drives (SDDs), read-only memory (ROM), random-access memory (RAM), CD-ROMs, magnetic tapes, floppy disks, and optical data storage devices.

It will be apparent to those skilled in the art that various modifications and variations can be made in the present disclosure without departing from the spirit or scope of the disclosure. Thus, it is intended that the present disclosure covers the modifications and variations of this disclosure provided they come within the scope of the appended claims and their equivalents.

What is claimed is:

1. A method for performing Bluetooth pairing with a mobile device by a head unit of a vehicle, the method comprising:
   initiating a Bluetooth pairing procedure between the mobile device and the head unit;
   storing an address of the mobile device upon the initiation of the pairing procedure;
   detecting an error generated in the pairing procedure; and
   automatically retrying the pairing procedure using the stored address of the mobile device or terminating the pairing procedure, based on a type of the detected error.

2. The method according to claim 1, further comprising:
   automatically retrying the pairing procedure using the stored address of the mobile device, when the type of the detected error corresponds to a case in which a signal indicating acceptance of the pairing procedure is not received from the mobile device for a certain period of time.

3. The method according to claim 1, further comprising:
   terminating the pairing procedure, when the type of the detected error corresponds to a case in which a signal indicating refusal of the pairing procedure is received from the mobile device.

4. The method according to claim 1, further comprising:
   transmitting a connection release message to the mobile device and then automatically retrying the pairing procedure using the stored address of the mobile device, when the type of the detected error corresponds to any case other than a case in which a signal indicating acceptance of the pairing procedure is not received from the mobile device for a certain period of time and a case in which a signal indicating refusal of the pairing procedure is received from the mobile device.

5. The method according to claim 4, wherein the connection release message is an LMP_detach message.

6. The method according to claim 1, wherein the address of the mobile device is a Bluetooth device (BD) address.

7. The method according to claim 1, wherein the automatic retrying of the pairing procedure comprises:
   transmitting an LMP_in_rand message to the mobile device.

8. A head unit of a vehicle for performing Bluetooth pairing with a mobile device, the head unit comprising:
   a Bluetooth module exchanging data according to a Bluetooth protocol and initiating a Bluetooth pairing procedure between the mobile device and the head unit;
   a memory storing an address of the mobile device upon the initiation of the pairing procedure by the Bluetooth module; and
   a controller providing control to detect an error generated in the pairing procedure and to automatically retry the pairing procedure using the stored address of the mobile device or terminate the pairing procedure, based on a type of the detected error.

9. The head unit according to claim 8, wherein, when the type of the detected error corresponds to a case in which a signal indicating acceptance of the pairing procedure is not received from the mobile device for a certain period of time, the controller automatically retries the pairing procedure using the stored address of the mobile device.

10. The head unit according to claim 8, wherein, when the type of the detected error corresponds to a case in which a signal indicating refusal of the pairing procedure is received from the mobile device, the controller terminates the pairing procedure.

11. The head unit according to claim 8, wherein, when the type of the detected error corresponds to any case other than a case in which a signal indicating acceptance of the pairing procedure is not received from the mobile device for a certain period of time and a case in which a signal indicating refusal of the pairing procedure is received from the mobile device, the controller transmits a connection release message to the mobile device and then automatically retries the pairing procedure using the stored address of the mobile device.

12. The head unit according to claim 11, wherein the connection release message is an LMP_detach message.

13. The head unit according to claim 8, wherein the address of the mobile device is a Bluetooth device (BD) address.

14. The head unit according to claim 8, wherein the controller provides control to transmit an LMP_in_rand message to the mobile device to automatically retry the pairing procedure.

15. A method for performing Bluetooth pairing between a head unit of a vehicle and a mobile device, the method comprising:
   initiating a Bluetooth pairing procedure between the head unit of the vehicle and the mobile device;
   displaying a menu for receiving input indicating whether a user accepts the pairing procedure on a display of the mobile device; and
   automatically retrying, by the head unit, the pairing procedure using a stored address of the mobile device when a signal indicating acceptance of the pairing procedure is not received from the mobile device for a certain period of time.

16. The method according to claim 15, further comprising:
   terminating, by the head unit, the pairing by the head unit when a signal indicating refusal of the pairing procedure is received from the mobile device.

17. The method according to claim 16, further comprising:
   transmitting, by the head unit, a connection release message to the mobile device in response to any pairing error other than errors corresponding to a case in which a signal indicating acceptance of the pairing procedure is not received from the mobile device for a certain period of time and a case in which a signal indicating refusal of the pairing procedure is received from the mobile device,
   wherein the automatic retrying of the pairing wherein is performed after the connection release message is transmitted.

* * * * *